Aug. 29, 1950     D. C. SCOTT     2,520,786
MACHINE FOR TESTING ELONGATION
Filed May 21, 1946
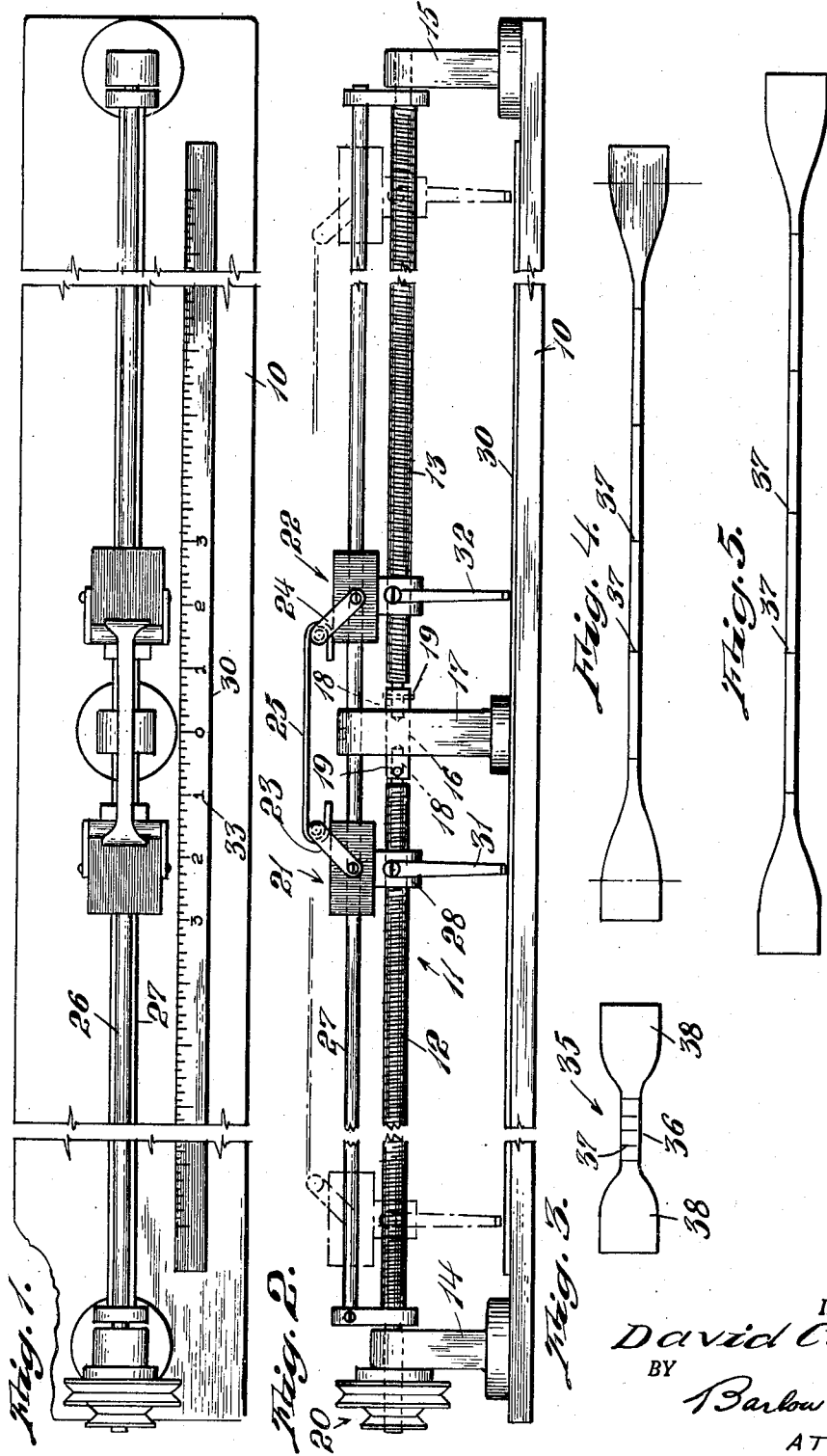
INVENTOR.
David C. Scott
BY
Barlow & Barlow
ATTORNEYS.

Patented Aug. 29, 1950

2,520,786

UNITED STATES PATENT OFFICE 2,520,786

MACHINE FOR TESTING ELONGATION

David C. Scott, Providence, R. I., assignor to Scott Testers, Inc., a corporation of Rhode Island Application May 21, 1946, Serial No. 671,303

4 Claims. (Cl. 73—95)

This invention relates to a testing machine and more particularly to a testing machine for testing the extensibility of some work which will stretch before it breaks.

In the testing of stretch, it is found certain materials which have considerable extendibility before breakage occurs will vary in the manner in which the test is applied. For instance, it is found that if a piece of material which has a substantial stretch before breakage such for instance as rubber is held at one end and grasped at some point distant therefrom and pulled by movement of the grasped portion that one performance of stretch will be noticeable. If, however, the opposite end of the material is moved instead to cause a stretch while the end which was first assumed to be the moved end is held stationary, a different condition will occur and it is still further found that if both ends are moved so that stretch is applied to the material a still different condition will occur which may be readily apparent by placing markings upon the material and observing the performance with reference thereto.

One of the objects of this invention is to provide a test for stretchable material in which the stretch will be substantially even throughout the distance between the gripping portions of the material.

A more specific object of this invention is to provide a device which is provided for evenly moving gripping clamps for a piece of material apart through each one moving the same distance during the same period of time.

With these and other objects in view, the invention consists of certain novel features of construction, as will be more fully described and particularly pointed out in the appended claims.

In the accompanying drawings:

Fig. 1 is a top plan view of a device which is provided for accomplishing the above results;

Fig. 2 is a side elevation thereof;

Fig. 3 is a top plan view of a specimen to be tested which is in its normal relaxed position;

Fig. 4 is a plan view of this specimen which has been gripped and pulled through a certain distance by reason of being operated upon by the above apparatus;

Fig. 5 is a top plan view of the specimen shown under still greater elongation.

In carrying out this invention, I provide gripping clamps to engage a specimen and then move these gripping clamps apart by a shaft which has opposite threads upon it both at the same pitch so that the clamps will move essentially evenly apart throughout the same space of time. The shaft is conveniently provided in two parts and coupled together and is driven from a single end. A scale is provided along the device so that the distance which the specimen has been stretched may be read directly from a scale opposite either of the clamps.

With reference to the drawings, 10 designates a base upon which there is mounted rotatably a shaft designated generally 11 and comprising sections 12 and 13 having end bearings in standards 14 and 15 while a sleeve 16 is rotatably mounted in a bearing 17 and receives reduced ends 18 of the shafts 12 and 13 which sleeve is secured to the shafts by pins 19. In this way, a single shaft is formed so as to be driven from the end such as by means of a pulley 20. Either section, however, may be detached by removing its pin 19 so that rotation of the section 12 may be had without rotation of the section 13.

Nuts 28 actuate carriages 21 and 22 provided with clamps 23 and 24 for a test specimen 25. These carriages 21 and 22 are slidably mounted on rods 26 and 27 while they have threaded engagement as at 28 with the threaded sections 12 and 13. A scale 30 is mounted upon the base 10 and indicating arms 31 and 32 extend downwardly from the nut portion of the carriages to move over this scale that the relative positions of the clamps may be obtained and the amount of stretch of the work at any time may be noted. The markings 33 upon this scale are double the distance of the movement of one of the clamps inasmuch as this same movement is made by the opposing clamp. Thus by reading opposite one clamp Figure 1, it will be known that the specimen has been stretched one inch from normal although this clamp will move only ½ inch.

The specimen which is designated generally 35 consists of a narrow section 36 upon which there are marks 37 spaced evenly apart. The ends 38 of the specimen are enlarged to provide a greater area for gripping the specimen. It is found that by moving evenly the clamps 23 and 24 that the marks 37 will move evenly apart through the various distances of stretch in the material as shown in Figs. 4 and 5. This is in contrast to the moving of one end of the work only while the other end is gripped and held stationary.

I claim:

1. A testing machine comprising a pair of clamps for gripping between them the specimen to be tested each provided with a threaded opening, means for mounting the clamps for guided movement toward and from each other in a straight line, threaded shafts having threads of the same pitch but of opposite lead with the threads of one lead engaging the threads of one clamp and the threads of the other lead engaging the threads of the other clamp, means to detachably connect said shafts together and means at the ends of one shaft for rotation of both shafts when connected together.

2. A testing machine as in claim 1 wherein said means to detachably connect said shafts comprises a sleeve into which said shafts extend and are each detachably connected thereto.

3. A testing machine as in claim 2 wherein said sleeve is rotatably mounted in a bearing.

4. A testing machine as in claim 1 wherein said means to detachably connect said shafts comprises a sleeve into which said shafts extend and are each detachably connected thereto by a pin extending through the shaft and sleeve.

DAVID C. SCOTT.

REFERENCES CITED

The following references are of record in the file of this patent:

UNITED STATES PATENTS

| Number | Name | Date |
|---|---|---|
| 1,190,597 | Scott | July 11, 1916 |
| 1,627,366 | Williams | May 3, 1927 |
| 1,708,359 | Coune | Apr. 9, 1929 |
| 1,882,802 | Giesler | Oct. 18, 1932 |
| 2,038,880 | Willshaw et al. | Apr. 28, 1936 |